(12) United States Patent
Li

(10) Patent No.: US 8,463,731 B2
(45) Date of Patent: Jun. 11, 2013

(54) TRANSLATING USER INTERACTION WITH A TOUCH SCREEN INTO TEXT

(75) Inventor: Yang Li, San Francisco, CA (US)

(73) Assignee: Google Inc., Mountain View, CA (US)

( * ) Notice: Subject to any disclaimer, the term of this patent is extended or adjusted under 35 U.S.C. 154(b) by 488 days.

(21) Appl. No.: 12/707,558

(22) Filed: Feb. 17, 2010

(65) Prior Publication Data
US 2011/0202493 A1 Aug. 18, 2011

(51) Int. Cl.
*G06F 17/00* (2006.01)
*G06N 5/02* (2006.01)

(52) U.S. Cl.
USPC .......................................................... 706/50

(58) Field of Classification Search
None
See application file for complete search history.

(56) References Cited

U.S. PATENT DOCUMENTS

| | | | |
|---|---|---|---|
| 6,097,841 A | 8/2000 | Gunji et al. | |
| 6,418,239 B1 | 7/2002 | Hullender et al. | |
| 6,751,605 B2 | 6/2004 | Gunji et al. | |
| 7,274,353 B2 | 9/2007 | Chiu et al. | |
| 7,580,551 B1 * | 8/2009 | Srihari et al. | 382/115 |
| 8,094,942 B1 * | 1/2012 | Rowley et al. | 382/187 |
| 2003/0016873 A1 | 1/2003 | Nagel et al. | |
| 2008/0260252 A1 | 10/2008 | Borgaonkar et al. | |
| 2009/0003706 A1 | 1/2009 | Chen et al. | |

FOREIGN PATENT DOCUMENTS

JP 9305716 A 11/1997

OTHER PUBLICATIONS

'Handbook for the Palm Zire 71 handheld': Palm, 2003, Palm Inc,.*
'The state of the art in on-line handwriting recognition': Tappert, 1990, IEEE, 787-808.*
Appert, C. And Zhai, S., Using strokes as command shortcuts: cognitive benefits and toolkit support, in CHI'09. 2009. p. 2289-2298.
Guimbretière, F. And Winogra, T., FlowMenu: Combining Command, Text and Parameter Entry, in UIST'00. 2000. p. 213-216.
Kristensson, P.O. And Zhai, S., Command strokes with and without preview: using pen gestures on keyboard for command selection, in CHI'07. 2007. p. 1137-1146.
Kurtenbach, G. And Buxton, W. The limits of expert performance using hierarchical marking menus. In CHI'93. 1993.

(Continued)

*Primary Examiner* — Kakali Chaki
*Assistant Examiner* — Peter Coughlan
(74) *Attorney, Agent, or Firm* — Troutman Sanders, LLP; James E. Schutz; Jay R. Anderson, Jr.

(57) ABSTRACT

Methods, systems, and apparatus, including computer programs encoded on a computer storage medium, for translating user interaction with a touchscreen into text are provided. In one embodiment, a method comprises receiving information characterizing a first user interaction with a touchscreen; receiving information characterizing a second user interaction with the touchscreen; assigning a probability to each of two or more interpretations of a combination of the first user interaction and the second user interaction, each of the interpretations construing the combination as a different pair of characters, each of the probabilities embodying a likelihood that the first user interaction and the second user interaction represent the respective pair of characters; using the two or more interpretations to search a collection of data for objects that are each identifiable by one of the two or more interpretations; and outputting identifiers of at least some of the objects.

22 Claims, 10 Drawing Sheets

OTHER PUBLICATIONS

Newman, M.W., et al., DENIM: An Informal Web Site Design Tool Inspired by Observations of Practice. Human-Computer Interaction, 2003. 18(3): p. 259-324.

Russell, S. and Norvig, P., Probabilistic Reasoning over Time. 2 ed. Artificial Intelligence: A Modern Approach. 2003: Prentice Hall. 537-583.

Sunburst™. http://www.samsung.com/us/consumer/mobile/mobile-phones/at-t-phones/SGHA697ZKAATT/index.idx?pagetype=prd__detail, considered without date.

Wobbrock, J.O., Wilson, A.D., and Li, Y. Gestures without libraries, toolkits or training: a $1 recognizer for user interface prototypes. In UIST'07. 2007.

Zhai, S. and Kristensson, P.-O. Shorthand writing on stylus keyboard. In CHI'03. 2003.

International Search Report as issued in PCT/US2011/025310 on Oct. 31, 2011.

* cited by examiner

TRANSLATING USER INTERACTION WITH A TOUCH SCREEN INTO TEXT

BACKGROUND

This specification relates to translating user interaction with a touchscreen into text. The text can be used, e.g., as the text of a search query.

People spends hours at a time with their electronic devices—computers, telephones, music players, PDA's, and the like. They like best those devices that are intuitive to use and whose interactions best meet their expectations regarding how machines should work. They interact with electronics through inputs and outputs from the devices, where the outputs generally are provided audibly and/or on a graphical display screen, and the inputs may occur via touchscreens, joysticks, mice, 4-directional keypads, and other such input mechanisms.

Touchscreens are graphical display devices that act as both inputs and outputs. In particular, touchscreens include a graphical display and detect the presence and location of manual interaction with that graphical display.

SUMMARY

This specification describes technologies relating to the translation of user interaction with a touchscreen into text. Text, such as the text of this specification, is a collection of alphanumeric and other characters. People can interact with a touchscreen to form such characters and generate text by writing the characters on the touchscreen. However, human handwriting can be ambiguous, especially when characters are formed on a relatively small touchscreen of a mobile device.

Accordingly, systems and techniques that allow touchscreen systems to translate user interaction into text are described. In a first aspect, a method is performed by system of one or more data processing devices. The method includes receiving, at the system, information characterizing a first user interaction with a touchscreen, receiving, at the system, information characterizing a second user interaction with the touchscreen, the system assigning a probability to each of two or more interpretations of a combination of the first user interaction and the second user interaction, the system using the two or more interpretations to search a collection of data for objects that are each identifiable by one of the two or more interpretations, and the system outputting identifiers of at least some of the objects. Each of the interpretations construes the combination as a different pair of characters. Each of the probabilities embodies a likelihood that the first user interaction and the second user interaction represent the respective pair of characters.

Other implementations of this first aspect and the second and third aspects can include one or more of the following features. Outputting the identifiers of the objects can include selecting, for output, a proper subset of the objects that are identifiable by one of the two or more interpretations, wherein the objects in the proper subset are selected based on the probability assigned to the interpretations by which the objects are identifiable. Outputting the identifiers of the objects can include selecting a proper subset of the objects that are identifiable by a first of the two or more interpretations and selecting a proper subset of the objects that are identifiable by a second of the two or more interpretations. A total number of objects selected for output is smaller than the number of objects identifiable by the first of the two or more interpretations. The first of the two or more interpretations is more likely to be correct than the second of the two or more interpretations. The system can be a handheld device that comprises the touchscreen and one or more data storage devices. the collection of data comprises data stored in the one or more data storage devices. Outputting the identifiers of the objects can include displaying the identifiers on the touchscreen. The second user interaction can include user interaction overlaid on a display of identifiers of objects that are each identifiable by one of the two or more interpretations of the first user interaction with the touchscreen. Searching the collection of data can include searching an index of identifiers of objects that are stored locally on the handheld device. The method can also include receiving, at the system, information characterizing a third user interaction with the touchscreen, the system assigning a probability to each of two or more interpretations of a combination of the first user interaction, the second user interaction, and the third user interaction, the system using the two or more interpretations to search the collection of data for objects that are each identifiable by one of the two or more interpretations of the combination of the first user interaction, the second user interaction, and the third user interaction, and the system outputting identifiers of the objects that are each identifiable by one of the two or more interpretations of the combination of the first user interaction, the second user interaction, and the third user interaction. Each of the interpretations can construe the combination as a different group of characters. Each of the probabilities can embody a likelihood that the first user interaction, the second user interaction, and the third user interaction represent the respective group of characters The method can also include receiving, at the system, a command specifying that the first user interaction is to be used to search for a first set of terms that begin with interpretations of the first user interaction and the second user interaction is to be used to search for a second set of terms that begin with interpretations of the second user interaction. The terms in the second set are associated with the terms in the first set. Assigning the probabilities to the interpretations of the combination of the first user interaction and the second user interaction can include assigning first probabilities to interpretations of the first user interaction, independently assigning second probabilities to interpretations of the second user interaction, and multiplying each of the first probabilities by each of the second probabilities to determine the probabilities assigned to the interpretations of the combination. The method can also include receiving, at the system, information characterizing an access history at a device that includes the touchscreen, the system scoring the objects using the access history, the score of each object embodying how often the object has been accessed by the device that includes the touchscreen, the system selecting a proper subset of the objects identifiable by one of the two or more interpretations based on the scores of the objects, and the system outputting identifiers of the objects in the proper subset. Outputting the identifiers of the objects can include marking the identifiers of the objects on a display screen to indicate why the objects are identifiable by the combination of the first user interaction and the second user interaction.

In a second aspect, a device includes a touchscreen, a data store comprising one or more data storage devices storing a collection of local data, the local data including personal contacts or media files, a data processor programmed to perform data processing activities. The activities include a drawn user input translator to translate first user interaction with the touchscreen into two or more characters, and a search engine to identify the personal contacts or the media files that are identifiable by the two or more characters into which the first user interaction is translated by the drawn user input translator, and a display manager to present identifiers of at least some of the personal contacts or the media files that are identified by the search engine on the touchscreen. A first of the identifiers presented on the touchscreen identifies a first contact or a first media file that is identifiable by a first of the characters into which the first user interaction is translated. A second of the identifiers presented on the touchscreen identifies a second contact or a second media file that is identifiable by a second of the characters into which the first user interaction is translated.

Other implementations of this second aspect and the first and third aspects can include one or more of the following features. The device can be a handheld device. A third contact or a third media file can be identifiable by one of the characters into which the first user interaction is translated. The data processor can also programmed to score the first contact or the first media file using a historical record of access of the first contact or the first media file, score the third contact or the third media file using a historical record of access of the third contact or the third media file, and select the first of the identifiers for presentation on the touchscreen in response to the first contact or the first media file having been accessed more often than the third contact or the third media file. The first of the identifiers can include a first marking indicating why the first contact or the first media file is identifiable by the first of the characters. The second of the identifiers can include a second marking indicating why the second contact or the second media file is identifiable by the second of the characters. The data processor can also be programmed to assign first probabilities to each of the two or more characters into which the first user interaction is translated, each of the probabilities embodying a likelihood that the first user interaction represents the respective character, independently assign second probabilities to each of two or more characters into which a second user interaction with the touchscreen is translated, each of the probabilities embodying a likelihood that the second user interaction represents the respective character, and multiply each of the first probabilities by each of the second probabilities. The data processor can also be programmed to select a proper subset of the contacts or media files that are identifiable by the first of the characters for a presentation on the touchscreen, and select a proper subset of the objects that are identifiable by the second of the characters for the presentation on the touchscreen. A total number of objects selected for output is smaller than the number of objects identifiable by the first of the characters. The first of the characters is more likely to be correct than the second of the second of the characters.

In a third aspect, a handheld device includes a system of one or more data processing devices, a data store of one or more data storage devices, and a touchscreen. The touchscreen displays a visual presentation of a collection of identifiers of candidate objects that are identifiable by multiple interpretations of user interaction representing one or more characters. At least two of the candidate objects are identifiable by different interpretations of the user interaction representing the one or more characters. At least a portion of the visual presentation of the identifier collection is operative to receive a subsequent user interaction representing a further character.

Other implementations of this third aspect and the second and first aspects can include one or more of the following features. The touchscreen can include a user interaction display area displaying smaller-sized likenesses of the user interaction. The visual presentation can include an identifier of a first candidate object that has been selected from amongst a collection of candidate objects that are identifiable by the multiple interpretations of the user interaction based on a historical record of access of the first candidate object. The visual presentation can also include an identifier of a second candidate object that has been selected from amongst a collection of candidate objects that are identifiable by the multiple interpretations of the user interaction without using a historical record of access of the second candidate object. The data store can include an index of the identifiers of the candidate objects, the candidate objects being stored in the data store. The candidate objects can include contacts and applications.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
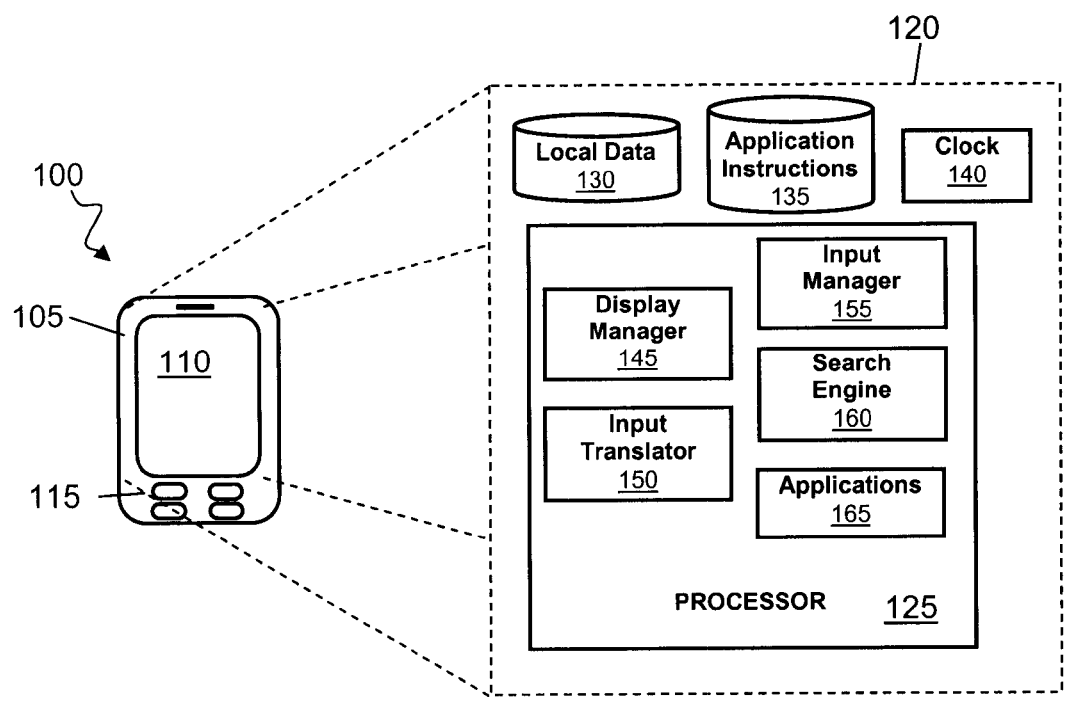
FIG. 1 is a schematic representation of a device that includes a touchscreen with which a user can interact.

FIG. 1 is a schematic representation of a device 100 that includes a touchscreen with which a user can interact. This interaction can be translated into text. Device 100 can be, e.g., a computer, a telephone, a music player, a PDA, a gaming device, or the like. In some implementations, device 100 can be mobile, hand-held device, as shown.

Device 100 include a housing 105, a touchscreen 110, and a collection of off-screen input elements 115. Housing 105 supports touchscreen 110 and input elements 115 and houses a collection of electronic components 120.

Touchscreen 110 is a graphical display that can act as both an input and an output. For example, touchscreen 110 can sense the position and movement of a user's finger or other elements. The sensed information can be translated into text by, e.g., electronic component collection 120. In some instances, the translations are used, e.g., as the text of a search query.

Input elements 115 are input devices that are "off" touchscreen 110. Input elements 115 are not part of touchscreen 110 and can receive input from a user that is distinct from the input received by touchscreen 110. Input elements 115 can include one or more key, pad, trackball, or other component that receives mechanical, audio, or other input from a user.

Electronic component collection 120 includes a digital data processor 125, a store for local data 130, a store for application instructions 135, and a clock 140. Digital data processor 125 is a system of one or more data processing devices that perform operations in accordance with one or more sets of machine-readable instructions. For example, digital data processor 125 performs operations in accordance with the instructions for implementing various applications stored in application instruction store 135. Among the applications that can be implemented by digital data processor 125 are a display manager 145, a drawn user input translator 150, an input manager 155, a search engine 160, and other applications 165. Processor 125 can be implemented using digital electronic circuitry, or in computer software, firmware, or hardware.

Display manager 145 is a software component that is configured to present content on touchscreen 110. Display manager 145 can receive content from a number of sources and may determine the details as to how the content is to be presented to a user. For example, display manager 145 can manage the display one or more of presentations 500, 7000, 1100, 1600 described below using content received from search engine 160.

Drawn user input translator 150 is a software component that is configured to interpret user interaction with touchscreen 110 as one or more characters. Ambiguous user interaction can be interpreted as potentially representing more that one character and drawn user input translator 150 can assign probabilities to the different interpretations of ambiguous user interaction based on the correspondence between the user interaction and idealized representations of the characters. In some implementations, drawn user input translator 150 can be tailored to interpret a particular individuals user interaction through machine learning or other techniques. In some implementations, drawn user input translator 150 can access both default and user-specific rules for interpreting user interaction as characters. The rules can be stored in one or more data storage devices of device 100

Input manager 155 is a software component that is configured to implement commands responsive to user interaction with various input elements of device 100 using control signals that can be interpreted by other components in collection 120. Such commands be input, e.g., over input elements 115 or touchscreen 110. For example, input manager 155 can place a call to a phone contact, access a resource available on the Internet, present a screen for authoring electronic mail, or start an application in response to a command responsive to user interaction.

Search engine 160 is a software component that is configured to search all or a portion of local data 130 and/or application instructions 135. In some implementations, as described further below, search engine 160 can search an index of the titles of contacts, bookmarks, applications, and/or media within local data 130 using multiple interpretations of user interaction with touchscreen 110 provided by drawn user input translator 150.

Other applications 165 are other software components that are performed by digital data processor 125. Applications 165 may take a variety of forms, such as mapping applications, e-mail and other messaging applications, web browser applications, music and video players, and various applications running within a web browser or running extensions of a web browser. Applications 165 may store files or other components having alphanumeric titles. Applications 165 may be implemented by input manager 155 in response to commands embodied by user interaction.

In some implementations, electronic component collection 120 also includes a wireless interface. A wireless interface is a device configured to manage communication with a wireless network, which may be a data network that also carries voice communications. A wireless interface can provide for communication by the device 100 with messaging services such as text messaging, e-mail, and telephone voice mail messaging and with a server system that translates user interaction with touchscreen 110 into text. In implementations where such a server system is used, processor need not implement drawn user input translator 150. Further, search engine 160 may be able to search with multiple interpretations of user interaction with touchscreen 110 that are received from such a server system.

Local data store 130 is a collection of data that is stored locally at device 100. The local data can include data which "personalizes" device 130, such as a user's media files (including music, movies, animation, and/or games), bookmarks, and contacts. In some implementations, local data store 130 can include an index of the titles of other data stored in local data store and the applications stored in application instruction store 135, as described further below. In some implementations, local data store 130 can also store profile information for a user. Profile information includes various parameters about a user of device 100, including a historical record of objects accessed and searches conducted, including the user interactions used to perform such searches. Profile information can be stored in a variety of forms, such as in one or more XML files or in Sqlite files.

Application instruction store 135 is a collection of machine-readable instructions that can be implemented by process 125, including display manager 145, input translator 150, input manager 155, search engine 160, and other applications 165. Local data store 130 and application instruction store 135 may be stored separately or together in one or more persistent data storage devices.

Clock 140 can be an integral part of process 125 or clock 155 can be a separate component, as shown.

Figure 2:
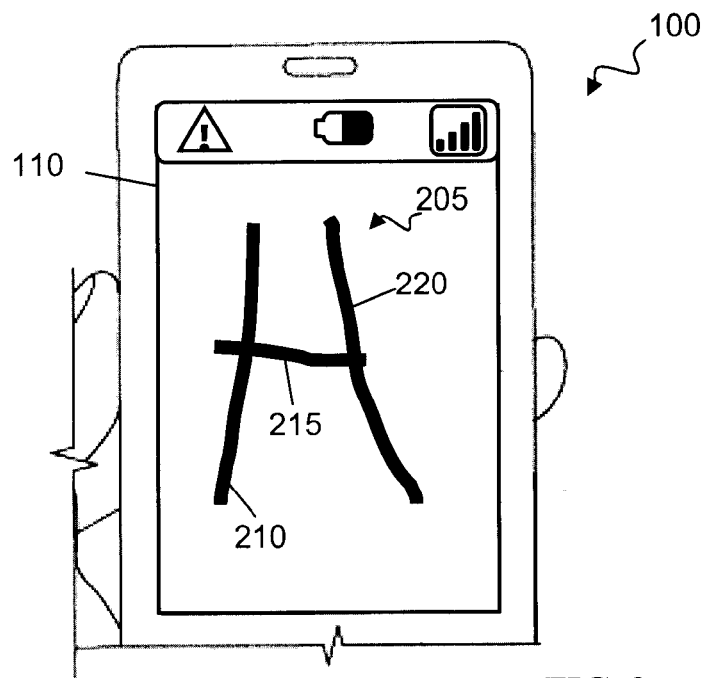
FIG. 2 is a schematic representation of interaction with the touchscreen of the device of FIG. 1.

FIG. 2 is a schematic representation of character interaction 205 with touchscreen 110 of device 100 (FIG. 1). Character interaction 205 is represented as a collection of lines 210, 215, 220 that follow the path of strokes across touchscreen 110. The strokes can be made using the tip of a fingertip or other element. In some implementations, lines 210, 215, 220 are displayed on touchscreen 110. In other implementations, lines 210, 215, 220 are not displayed on touchscreen 110. In either case, information characterizing the path of lines 210, 215, 220 is collected and translated by device 100.

For the sake of convenience, other user interaction with touchscreen 110 is represented herein using comparable lines which may or may not actually be displayed on touchscreen 110.

As shown, the character interaction 205 represented by lines 210, 215, 220 is ambiguous. For example, the paths of lines 210, 215, 220 are not precise. The starting and end points of lines 210, 215, 220 are also not exact. Further, lines 210, 220 appear to lean toward one another but they do not meet at their tops. Character interaction 205 could thus reasonably be interpreted as a more than one character. For example, character interaction 205 could reasonably be interpreted as either an "H" or an "A." Such ambiguity is not only inherent to human handwriting, but it is also worsened by the operational context of device 100. In particular, touchscreen 110 may be relatively small, e.g., as part of a mobile device. Further, a user may not be properly positioned to interact with touchscreen 110. Indeed, the user may even be walking while forming lines 210, 215, 220.

Figure 3:
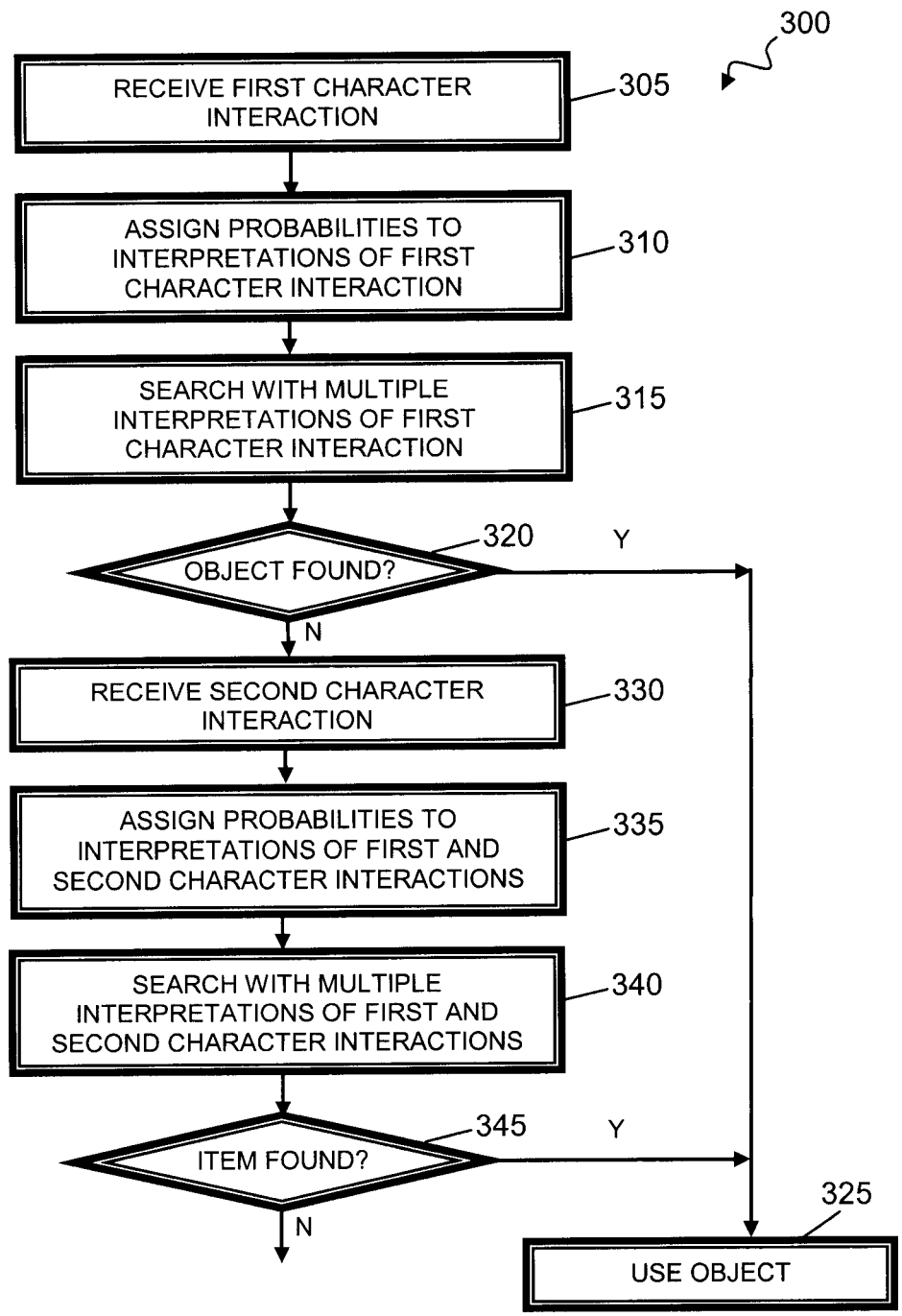
FIG. 3 is a flow chart of a process for translating user interaction with a touchscreen into text.
Figure 15:
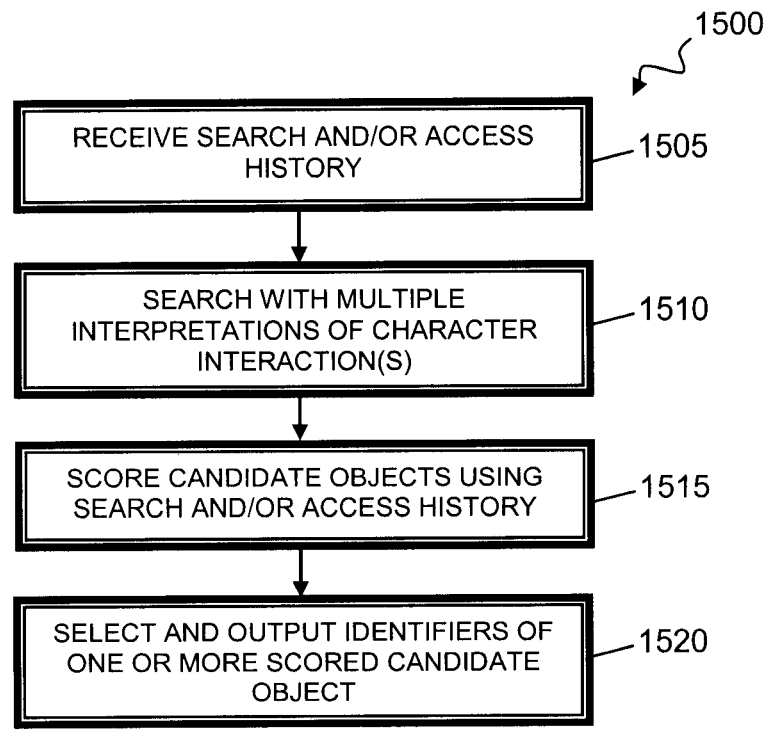
FIG. 15 is a flow chart of a process for using text translations of user interaction with a touchscreen.

FIG. 3 is a flow chart of a process 300 for translating user interaction with a touchscreen into text. In general, process 300 is performed by a device that includes a touchscreen, such as device 100 (FIG. 1). However, in other implementations, process 300 is performed by a digital data processing system that receives information characterizing user interaction with a device that includes a touchscreen. For example, in some implementations, process 300 can be performed by a server system that hosts a search engine or other service provider. Process 300 can be performed in isolation or in conjunction with other digital data processing operations. For example, in some implementations, process 300 can be performed in conjunction with process 1500 (FIG. 15).

The device performing process 300 receives information characterizing a first character interaction at block 305. A character interaction is user interaction with a touchscreen that represents a character. Often, a character interaction is ambiguous and reasonably can be interpreted as a more than one character. The character interaction can be received directly from a user who is interacting with a touchscreen of the device that is performing process 300 or indirectly from a device that includes such a touchscreen.

User interaction that represents a character can be distinguished from user interaction that does not represent a character in a number of ways. For example, a user can interact with a touchscreen or other input device to specify that subsequent user interaction represents a character. As another example, a device can constrain user interaction to being interpreted as characters, e.g., by default or at certain stages in a sequence of data processing activities. In some implementations, the constraint can be identified by text of other indicium that indicates, to a user, that user interaction at this stage is to be interpreted as characters.

User interaction representing separate characters (e.g., user interaction representing a first character and user interaction representing a second character) can also be distinguished in a number of ways. For example, in some implementations, a period of time without user interaction (i.e., a "timeout") can be interpreted as separating successive characters. In some implementations, the duration of such a timeout can be between 250 and 450 ms, or about 300 ms. As another example, the device performing process 300 can distinguish between successive characters based on affirmative input received from a user. For example, input identifying the end of user interaction representing a character can be received using an "end-of-character" widget on the touchscreen itself or using another input device.

The device performing process 300 assigns probabilities to different interpretations of the first character interaction at block 305. Interpreting a character interaction construes the character interaction as a particular character. Each of the interpretations is assigned a probability that embodies how likely it is that the character interaction does indeed represent a particular character. The probabilities can be expressed, e.g., as percent likelihoods.

The device performing process 300 searches one or more collections of data with multiple interpretations of the first character interaction at block 315. In some implementations, the device can search one or more indices of local data using the multiple interpretations, as described further below.

The device performing process 300 can determine whether the object of the search has been found at block 320. The object of the search can be, e.g., a contact in a contact list, an application, a media or other electronic file, a bookmark, an electronic document, or the like. The device can determine whether the object of the search is found in a number of different ways. For example, as described further below, in some implementation the device can present a collection of identifiers of candidate objects that are yielded by the search at block 315 to the user. The device can also receive user interaction with an identifier within the collection of candidate object identifiers that identifies the object of the search. As another example, in some instances, the search at block 315 with the different interpretations may be reasonably conclusive. In particular, even with multiple interpretations of the first character interaction being used in the search, only a single object is reasonably identified by the search. For example, the device performing process 300 may compare the probability that a first object is identified by the different interpretations with a probability threshold. If the probability exceeds the threshold, then the device can reasonably determine that the object of the search has been found. Since multiple interpretations of the first character interaction are used in the search at block 315, a result generally will be reasonably conclusive only when the searched collection of data is relatively small.

In response to determining that the object of the search has been found, the device performing process 300 can use the object to perform other activities as needed at block 325. For example, object data can be displayed to a user on a display screen, object instructions can be executed, an object resource can be accessed on the Internet, object media can be played or otherwise presented to a user, or combinations of these and other activities can be performed.

In response to determining that the object of the search has not been found, the device performing process 300 receives information characterizing a second character interaction at block 330. The second character interaction can also be ambiguous and received directly from a user who is interacting with a touchscreen of the device that is performing process 300 or indirectly from a device that includes such a touchscreen.

The device performing process 300 assigns probabilities to different interpretations of a combination of the first and the second character interactions at block 335. Interpreting a combination of character interactions construes the character interactions as a particular combination of characters. Each of the interpretations is assigned a probability that embodies how likely it is that the first and the second character interactions do indeed represent a particular combination of characters. The probabilities can be expressed, e.g., as percent likelihoods.

Figure 4:
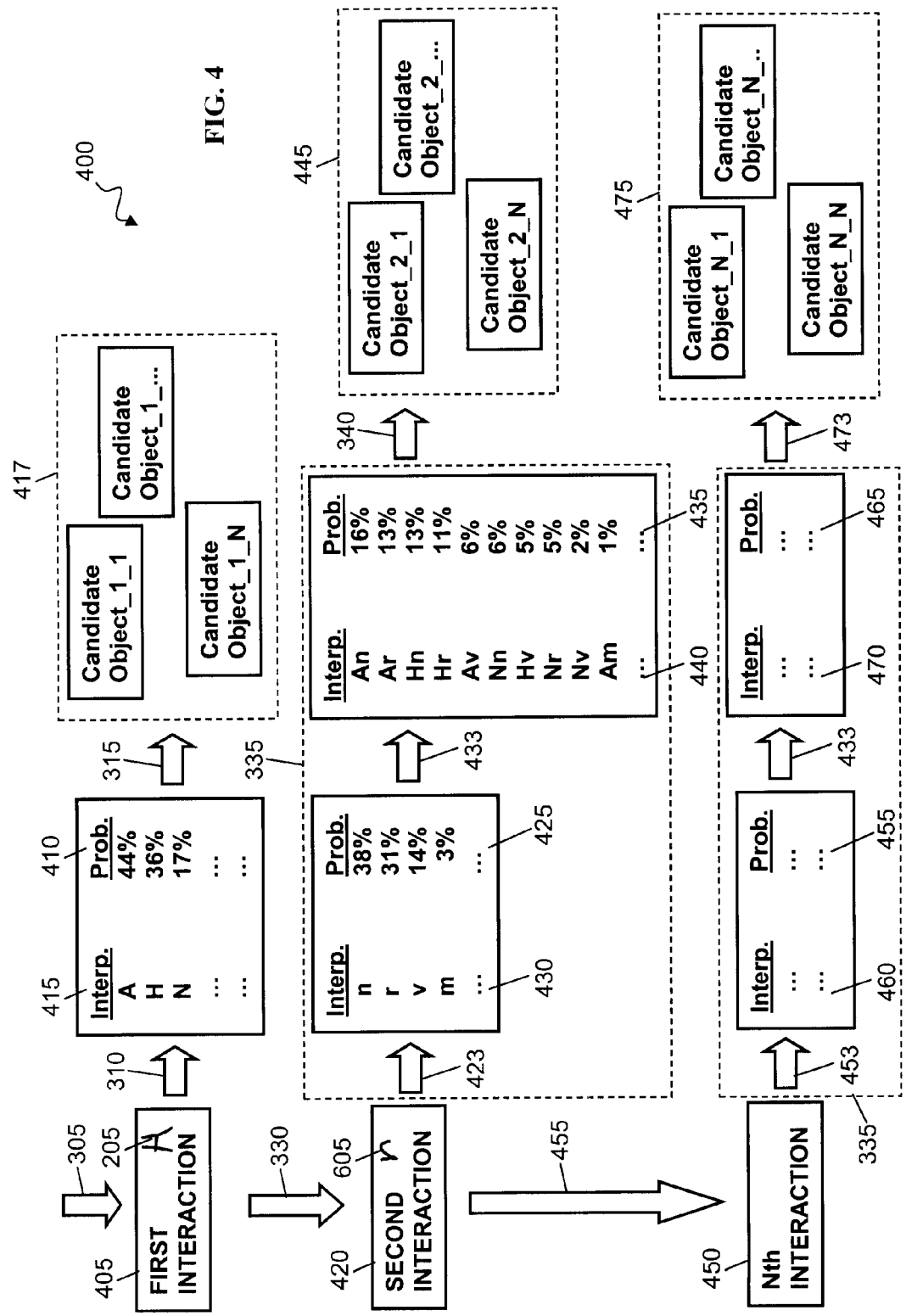
FIG. 4 is a schematic representation of an illustrative performance of activities that include activities in the process of FIG. 3.

In some implementations, probabilities can be assigned to different interpretations of the combination of the first and the second character interactions by:

independently assigning probabilities to different interpretations of the first character interaction and different interpretations of the second character interaction; and multiplying each probability of each interpretation of the first character interaction by each probability of each interpretation of the second character interaction to yield probabilities of the respective combinations of the first and second characters. The probabilities assigned to different interpretations of the first character interaction are independent of the probabilities assigned to different interpretations of the second character interaction in that the probabilities assigned to different interpretations of the first character interaction do not change the assignment of probabilities to interpretations of the second character interaction. In such cases, the assignment of probabilities to interpretations of different character interactions can be made with a single set of rules that considers each character interaction as a distinct, separate entity. An example of this approach is illustrated in FIG. 4.

In other implementations, the probabilities which are assigned to different interpretations of the second character interaction are not independent of the probabilities assigned to different interpretations of the first character interaction. For example, if the first character interaction is likely to be a particular letter (e.g., an "N"), the probabilities of interpretations of the second character that yield character combinations which are uncommon (e.g., "NN" and "NH") can be reduced but the probabilities of interpretations of the second character that yield character combinations which are common (e.g., "NA") can be increased. As a result of such an approach, the probabilities which are assigned to different interpretations of the combination of the first and the second character interactions also change.

In other implementations, the device performing process 300 uses machine learning or other techniques to assign probabilities to interpretations of characters that are based on interpretations of previous characters which have been confirmed. For example, if previous character interactions that resemble a new character interactions have been confirmed to represent a particular character, then the device performing process 300 can increase the probability assigned to the interpretation of the new character as that particular character. In effect, the device performing process 300 can "learn to read a user's handwriting" and store user-specific rules for character interpretation.

The device performing process 300 searches one or more databases with multiple interpretations of the combination of the first and the second character interactions at block 340. In some implementations, the device can search one or more indices of local data using the multiple interpretations, as described further below.

The device performing process 300 can determine whether the object of the search has found at block 345, e.g., by receiving user interaction identifying the object of the search within a collection of candidate objects identified at block 340 or by determining that a first object is reasonably conclusively identified by the different interpretations of the first and the second character interactions.

In response to determining that the object of the search has been found, the device performing process 300 can use the object to perform other activities as needed at block 325.

In response to determining that the object of the search has not been found, the device performing process 300 can continue to receive information characterizing one or more additional character interactions, assign probabilities to different interpretations of a combination of the first, the second, and the additional character interactions, and search one or more databases with multiple interpretations of the combination of the character interactions until determining that the object of the search has been found. In general, process 300 is implemented in a recursive algorithm rather than the sequential series illustratively presented here.

FIG. 4 is a schematic representation of an illustrative performance 400 of activities that include activities in process 300 (FIG. 3). Performance 400 corresponds with the user interaction with a device that includes a touchscreen that is schematically represented in FIGS. 2 and 5-7.

In performance 400, character interaction 205 (FIG. 2) is the first character interaction 405 that is received by a device that is performing the activities. The device assigns probabilities 410 to different interpretations 415 of user interaction 205. In illustrative performance 400, the different interpretations 415 of character interaction 205 include the character "A," the character "H," the character "N," and possibly other interpretations. The probabilities 410 assigned to interpretations 415 are expressed as percents. The device searches one or more collections of data using the interpretations 415 to yield a collection 417 of candidate objects.

Figure 5:
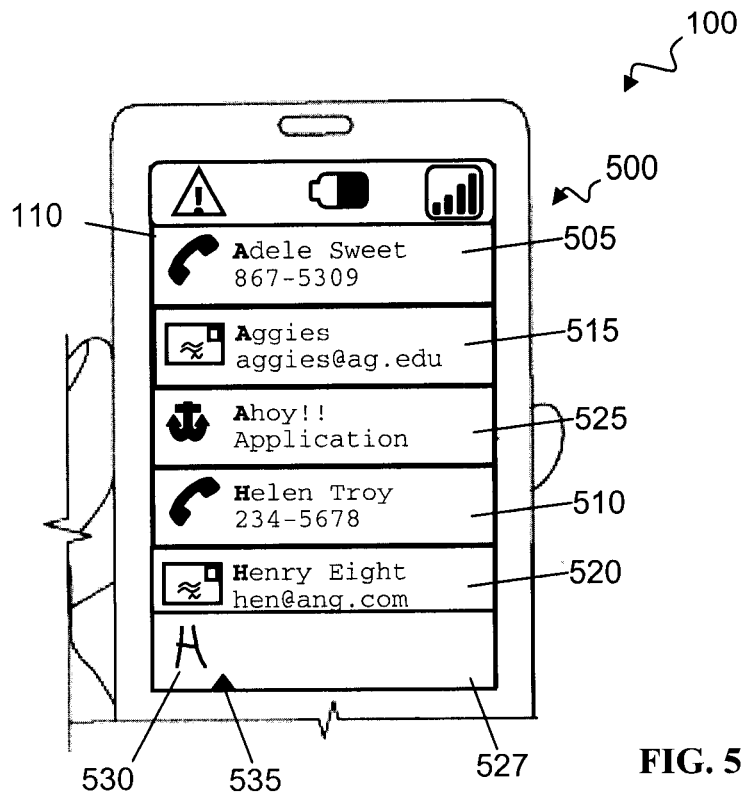
FIG. 5 is a schematic representation of a presentation of identifiers of candidate objects on the touchscreen of the device of FIG. 1.

FIG. 5 is a schematic representation of a presentation 500 of identifiers of at least a portion of the candidate objects in collection 415 on touchscreen 110 of device 100. The candidate object identifiers presented in presentation 500 includes a pair of phone contact object identifiers 505, 510, a pair of electronic mail contact object identifiers 515, 520, and an application object identifier 525.

Phone contact object identifiers 505, 510 are identifiers of objects drawn, e.g., from a phone or other contact list. Phone contact object identifiers 505, 510 each include a name or other identifier of the contact, the phone number of the contact, and an indicium that indicates that phone contact object identifiers 505, 510 identify phone contacts. In the illustrated implementation, the indicium in phone contact object identifiers 505, 510 is a stylistic representation of a phone handset. Phone contact object identifiers 505, 510 are marked to indicate why they are identifiable by first character interaction 405. In this regard, the first characters of the contact identifiers in phone contact object identifiers 505, 510 are displayed in boldface type to indicate that they are matched by one of the interpretations of first character interaction 405. In particular, the first character in the contact identifier in phone contact object identifier 505 matches a first interpretation of first character interaction 405 (i.e., the interpretation "A") whereas the first character in the contact identifier in phone contact object identifier 510 matches a second interpretation of first character interaction 405 (i.e., the interpretation "H").

Electronic mail contact object identifiers 515, 520 are identifiers of objects drawn, e.g., from an electronic mail or other contact list. Electronic mail contact object identifiers 515, 520 each include a name or other identifier of the contact, the electronic mail address of the contact, and an indicium that indicates that electronic mail contact object identifiers 515, 520 identify electronic mail contacts. In the illustrated implementation, the indicium in electronic mail contact object identifiers 515, 520 is a stylistic representation of an envelope. Electronic mail contact object identifiers 515, 520 are marked to indicate why they are identifiable by first character interaction 405. In this regard, the first characters of the contact identifiers in electronic mail contact object identifiers 515, 520 are displayed in boldface type to indicate that they are matched by one of the interpretations of first character interaction 405. In particular, the first character in the contact identifier in electronic mail contact object identifier 515 matches a first interpretation of first character interaction 405 (i.e., the interpretation "A") whereas the first character in the contact identifier in electronic mail contact object identifier 520 matches a second interpretation of first character interaction 405 (i.e., the interpretation "H").

Application object identifier 525 identifies an object drawn from a collection of applications that are available on device 100. Application object identifier 525 includes a name or other textual identifier of the application, a text or other indicium that indicates that application object 525 is indeed an application, and a graphical identifier of the application. In the illustrated implementation, the graphical identifier in application object 525 is a stylistic representation of an anchor. Application object 525 is marked to indicate why it is identifiable by first character interaction 405. In this regard, the first character of the textual identifier in application object identifier 525 is displayed in boldface type to indicate that it is matched by one of the interpretations of first character interaction 405. In particular, the first character in the textual identifier in application object identifier 525 matches a first interpretation of first character interaction 405 (i.e., the interpretation "A").

In some instances, more objects will be candidates for satisfying a search with multiple interpretations of one or more character interactions then can reasonably be presented in a single presentation, such as presentation 500. For example, referring to the illustrated implementation, there may be more than five objects that are identifiable by first character interaction 405. However, only five object identifiers are presented in presentation 500 and these five object identifiers occupy the majority of touchscreen 110.

Device 100 may select to identify certain objects in a presentation based on the probabilities assigned to different interpretations of the one or more character interactions. For example, in response to a first interpretation of the one or more character interactions being noticeably more likely than all other interpretations, only objects that are identifiable by the first interpretation are identified in a presentation. As another example, in response to two different interpretations of the one or more character interactions being comparably probable, objects that are identifiable by both interpretations can be identified in a presentation. For example, in the illustrated instance, the probabilities of interpreting character interaction 205 as either an "A" or an "H" may be sufficiently close and objects that are identifiable by both "A" and "H" are identified in presentation 500. This is true even though there may be more than three objects which are identifiable by the most probable interpretation "A."

In some implementations, the number of object identifiers in such a presentation that are identifiable by each interpretation reflects the probability that the interpretation is correct. For example, if a first interpretation is twice as likely to be correct as both of the two next most probable interpretations, then a presentation identifies twice as many candidate objects that are identifiable by the first interpretation as candidate objects that are identifiable by either of the two next most probable interpretations. In some implementations, candidate objects that are identifiable by interpretations that fall below a certain threshold probability (e.g., 10%) are excluded from such a presentation.

In some implementations, candidate objects are identified in such a presentation in alphabetical order regardless of the probability that the interpretation by which the candidate objects are identified is correct. In other implementations, identifiers of candidate objects are ordered in such a presentation according to the probabilities that the interpretation by which that candidate objects are identified is correct.

In some implementations, if the probability that the interpretation by which two or more candidate objects are identified is correct is the same for two different candidate objects, other factors can be considered. For example, in some implementations, certain categories of candidate objects can be order above other categories of candidate objects. In some implementations, identifiers of contact candidate objects are positioned before identifiers of applications, which in turn are positioned before identifiers of bookmarks, which in turn are positioned before identifiers of media. If insufficient space is available to display all the identifiers, only the first few identifiers are presented.

Another example of a factor that can be considered in response to the probability being the same is the number of terms in an identifier. For example, identifiers that have fewer terms can be positioned before identifiers that have more terms in a presentation. If insufficient space is available to display all the identifiers, only the first few identifiers are presented.

Another example of factor that can be considered in response to the probability being the same is the frequency that a candidate object has been accessed and the time that has passed since the last access, as described further below.

In the illustrated implementation, touchscreen 110 of device 100 also includes a character interaction display area 527. Character interaction display area 527 is a portion of touchscreen 110 that displays smaller-sized likenesses of character interactions received by device 100. In the state shown, character interaction display area 527 includes a likeness 530 of first character interaction 405. By displaying such likenesses along with indications as to the candidate objects that are identifiable by first character interaction 405, a user can compare the interpretations of first character interaction 405 by device 100 with his or her intent. Character interaction display area 527 also includes a cursor indicium 535 that advances to the right across character interaction display area 527 as character interactions are received and to the left across character interaction display area 527 as character interactions are deleted, as discussed further below. In the illustrated implementation, cursor indicium 535 is triangular. In other implementations, cursor indicium 535 can be shaped differently, e.g., as a line.

In some instances, the object of the search is identified among object identifiers 505, 510, 515, 520, 525. In such cases, a user who recognizes it can interact with device 100 to access the object of the search. For example, the user can single- or double-tap on the identifier of the object of the search to, e.g., place a call to a phone contact, access a resource available on the Internet, author and/or send an electronic mail to an electronic mail contact, or start an application identified by an application object identifier. In some implementations, the object of the search and a description of the character interaction is recorded on a search and/or access history.

Figure 6:
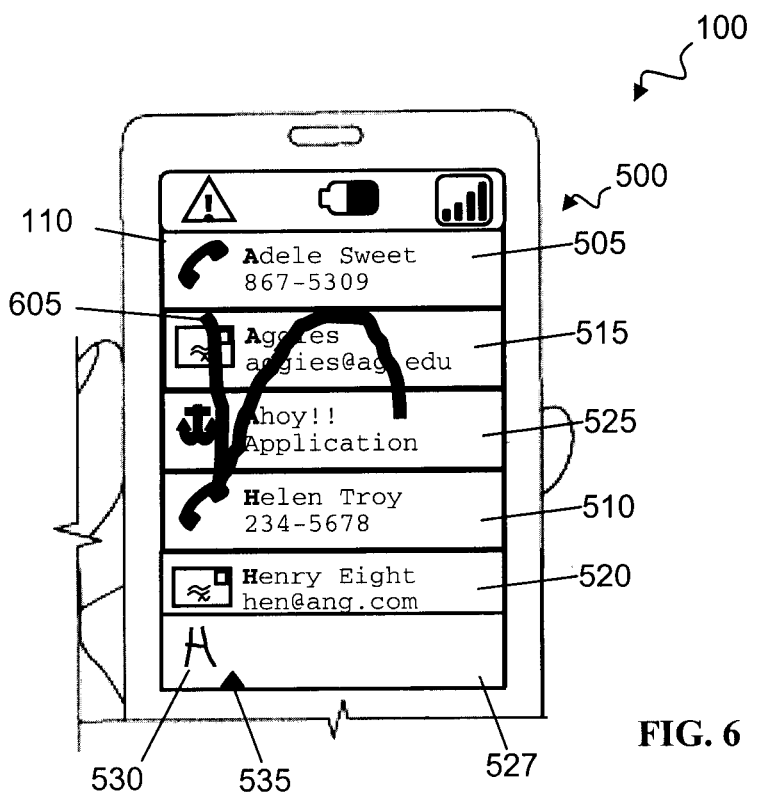
FIG. 6 includes a schematic representation of user interaction being received by the touchscreen of the device of FIG. 1.

If the object of the search is not identified in presentation 500, touchscreen 110 can interact with a user to receive a second character interaction. FIG. 6 includes a schematic representation of such a character interaction 605 being received by touchscreen 110. In the illustrated implementation, character interaction 605 is received over the same portion of presentation 500 that presents candidate object identifiers. With the portion of presentation 500 that presents candidate object identifiers available to receive character interaction 605, all or a large portion of touchscreen 110 is available to receive character interaction 605. The relatively large size on touchscreen 110 available for input makes it easier for a user to enter character interaction 605 and increases the likelihood that interpretations of character interaction 605 will be accurate.

Although character interaction 605 is shown as displayed overlaid upon the candidate object identifiers in presentation 500, this is not necessarily the case. Indeed, character interaction 605 need not be displayed on touchscreen 110 at all.

Character interaction 605 is ambiguous and could reasonably be interpreted as a more than one character. In particular, character interaction 605 could reasonably be interpreted as, e.g., an "n", an "r," a "v" or even other characters.

Returning to FIG. 4, character interaction 605 (FIG. 2) is the second character interaction 420 that is received by the device that is performing the activities. To assign probabilities to different interpretations of the combination of first character interaction 405 and second character interaction 420, the device first assigns (at 423) probabilities 425 to different interpretations 430 of user interaction 605 independently of the probabilities 410 of interpretations 415 of user interaction 405. In illustrative performance 400, the different interpretations 430 of character interaction 605 include the character "n," the character "r," the character "v," the character "m," and possibly other interpretations. The probabilities 425 assigned to interpretations 430 are expressed as percents.

At 433, the device multiplies each probability 410 by each probability 425 to determine probabilities 435 for different combinations 440 of interpretations of first character interaction 405 and second character interaction 420. Combination interpretations 440 are examples of combinations of the first character interaction 405 and second character interaction 420 to which probabilities are assigned at block 335 in process 300 (FIG. 3). The probabilities 435 assigned to combination interpretations 440 are also expressed as percents.

The device searches one or more collections of data using the combination interpretations 440 to yield a collection 445 of candidate objects.

Figure 7:
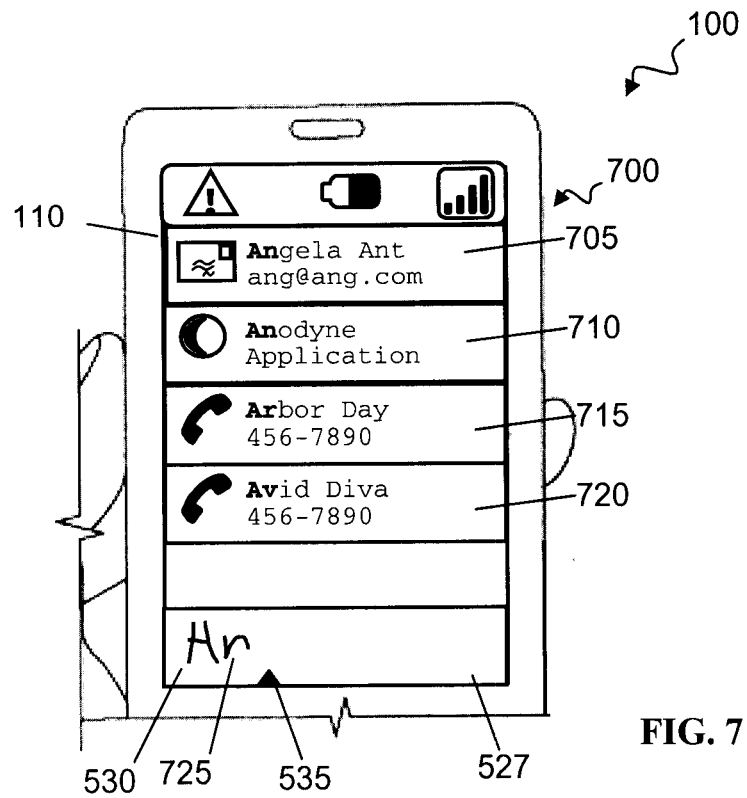
FIG. 7 is a schematic representation of a presentation of identifiers of candidate objects on the touchscreen of the device of FIG. 1.

FIG. 7 is a schematic representation of a presentation 700 of identifiers of at least a portion of the candidate objects in collection 445 on touchscreen 110 of device 100 (FIG. 1). The candidate object identifiers presented in presentation 500 include an electronic mail contact object identifier 705, an application object identifier 710, and a pair of phone contact object identifiers 715, 720. Each of object identifiers 705, 710, 715, 720 is marked to indicate why it is identifiable by an interpretation of the combination of first character interaction 405 and second character interaction 420. In particular, the first two letters of respective contact identifiers of phone and electronic mail contact object identifiers 705, 715, 720 and the textual identifier in application object identifier 710 are displayed in boldface type to indicate that they are matched by one of the interpretations of the combination of first character interaction 405 and second character interaction 420. As shown, object identifiers 705, 710, 715, 720 need not be matched to the same interpretation. For example, phone contact object identifier 715 is matched to the interpretation of character interactions 405, 420 as the letter sequence "Ar" whereas phone contact object identifier 720 is matched to the interpretation of character interactions 405, 420 as the letter sequence "Av."

As shown, character interaction display area 527 has been updated to include a likeness 725 of second character interaction 605. Further, cursor indicium 535 has been advanced to the right across character interaction display area 527 to indicate receipt of second character interaction 605. In some instances, an identifier of the object of the search is among object identifiers 705, 710, 715, 720 and a user who recognizes it can interact with device 100 to access the object of the search.

If the object of the search is not identified among candidate object identifier collection 700, touchscreen 110 can interact with a user to receive one or more additional character interactions. Returning to FIG. 4, the receipt of such additional character interactions 450 is represented by arrow 455. To assign probabilities to different interpretations of the combination of first character interaction 405, second character interaction 420 and the additional character interactions 450, the device first assigns (at 453) probabilities 455 to different interpretations 460 of the additional user interaction independently of probabilities of interpretations of other, preceding user interaction, including probabilities 410, 425.

At 433, the device multiplies each probability 455 by the probabilities of each interpretation of other, preceding user interaction (including probabilities 410, 425) to determine probabilities 465 for different combinations 470 of interpretations of first character interaction 405, second character interaction 420, and the one or more additional character interactions 450. The device can searches one or more collections of data at 473 using the interpretation combinations 440 to yield additional collections 475 of candidate objects. The additional objects can be presented to a user as desired, e.g., on touchscreen 110 of device 100.

Figure 8:
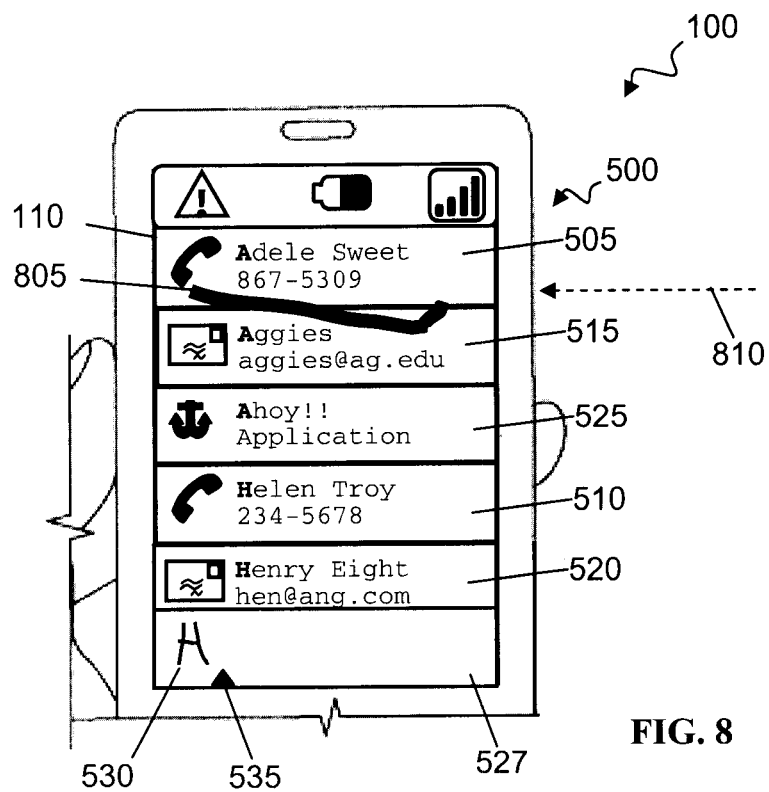
FIG. 8 is a schematic representation of the receipt of user interaction that specifies that search is to be conducted using interpretations of character interactions as two separate prefixes.

In some implementations, interaction with touchscreen 110 of device 100 can be interpreted as commands that specify details regarding the use of character interactions that have been translated into text. For example, FIG. 8 is a schematic representation of the receipt of user interaction 805 that specifies that search is to be conducted using interpretations of the combination of character interactions as two separate prefixes. In particular, user interaction 805 specifies that character interactions preceding user interaction 805 are to be interpreted and used to search for a first set of terms that begin with the interpretations of preceding character interactions and that character interactions following user interaction 805 are to be interpreted and used to search for a second set of terms that are both associated with terms in the first set and that begin with the interpretations of subsequent character interactions. The search specified by user interaction 805 thus identifies associated pairs of terms where the first term begins with interpretations of the preceding character interactions and the second term begins with interpretations of the subsequent character interactions. User interaction 805 can be received, e.g., with candidate object identifiers from prior searches presented on touchscreen 110 (e.g., presentation 500 in the illustrated implementation).

In the illustrated implementation, user interaction 805 resembles a line drawn horizontally across touchscreen 110. User interaction 805 can be distinguished from other user interaction with touchscreen 110 (such as character interactions) in a number of ways. For example, in some implementations, a timeout can be interpreted as separating user interaction 805 from other interactions with touchscreen 110. In some implementations, the duration of such a timeout can be between 250 and 450 ms, or about 300 ms. As another example, the device performing process 300 can separate user interaction 805 from other interactions with touchscreen 110 based on affirmative input received from a user.

In the illustrated implementation, user interaction 805 is received over the same portion of presentation 500 that presents candidate object identifiers. Thus, all or a large portion of touchscreen 110 is available to receive user interaction 805. Although user interaction 805 is shown as displayed overlaid upon the candidate objects in presentation 500, this is not necessarily the case. Indeed, user interaction 805 need not be displayed on touchscreen 110 at all.

In some implementations, the device interpreting user interaction can require that user interaction 805 be formed by movement across touchscreen 110 in a certain direction. For example, the device interpreting user interaction with touchscreen 110 may only interpret paths of a member moving horizontally from right to left, i.e., in the direction of arrow 810, as user interaction. Such a directionality requirement can be useful in distinguishing user interaction 805 from character interactions, especially character interactions that are interpreted as characters in the Latin alphabet where horizontal lines are generally formed by convention from left to right.

For the sake of consistency, user interaction 805 is shown received in the context of the display of presentation 500 by device 100. However, user interaction 805 can also be received in other contexts, including those where multiple character interactions precede or follow user interaction 805. For example, user interaction 805 can be received in the context of the display of presentation 700 by device 100.

Figure 9:
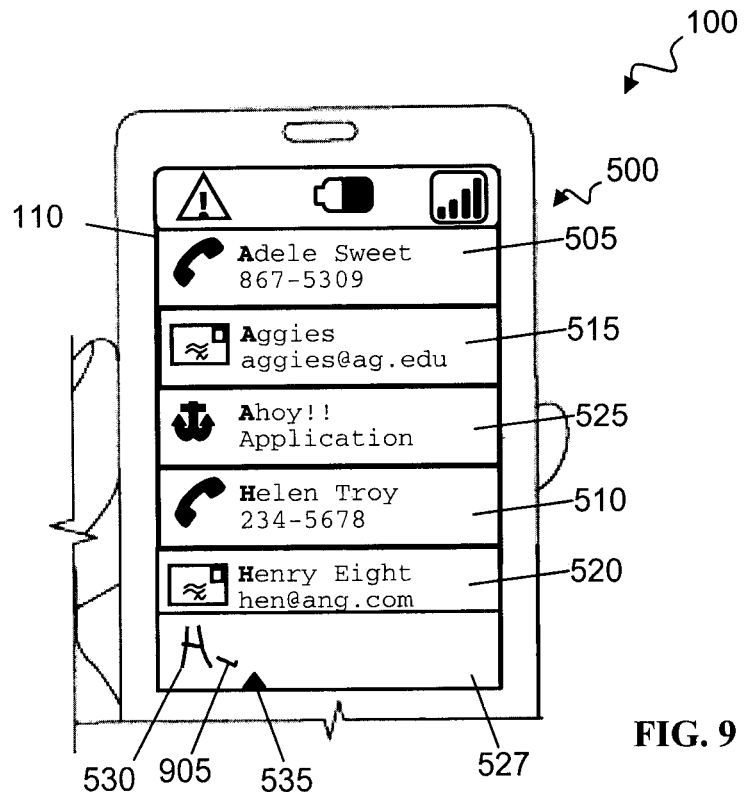
FIG. 9 is a schematic representation of the touchscreen of the device of FIG. 1 after user interaction has been interpreted to be user interaction that specifies that search is to be conducted using interpretations of character interactions as two separate prefixes.

FIG. 9 is a schematic representation of touchscreen 110 after user interaction with touchscreen 110 has been interpreted to be user interaction 805. As shown, character interaction display area 527 has been updated to include a likeness 905 of user interaction 805. Further, cursor indicium 535 has been advanced to the right across character interaction display area 527 to indicate receipt of user interaction 805.

Figure 10:
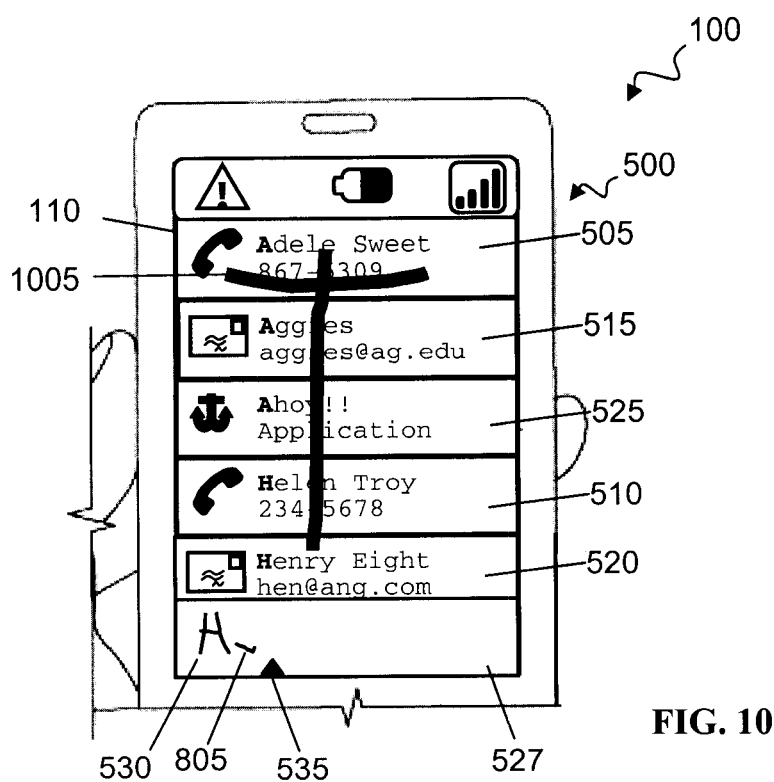
FIG. 10 includes a schematic representation of the receipt of subsequent user interaction by the touchscreen of the device of FIG. 1.

FIG. 10 includes a schematic representation of the receipt of a subsequent character interaction 1005 by touchscreen 110 of device 100. Subsequent character interaction 1005 is received after receipt of user interaction 805 and can be received over the same portion of presentation 500 that presents candidate objects. Although character interaction 1005 is shown as displayed overlaid upon the candidate object identifiers in presentation 500, this is not necessarily the case. Indeed, character interaction 1005 need not be displayed on touchscreen 110 at all. Character interaction 605 is ambiguous and can be interpreted as, e.g., an "T", a "Y," or even other characters.

Subsequent character interaction 1005 can be used in combination with the preceding character interactions to conduct a search of one or more collections of data, e.g., using process 300 (FIG. 3) with the constraint specified by user interaction 805.

Figure 11:
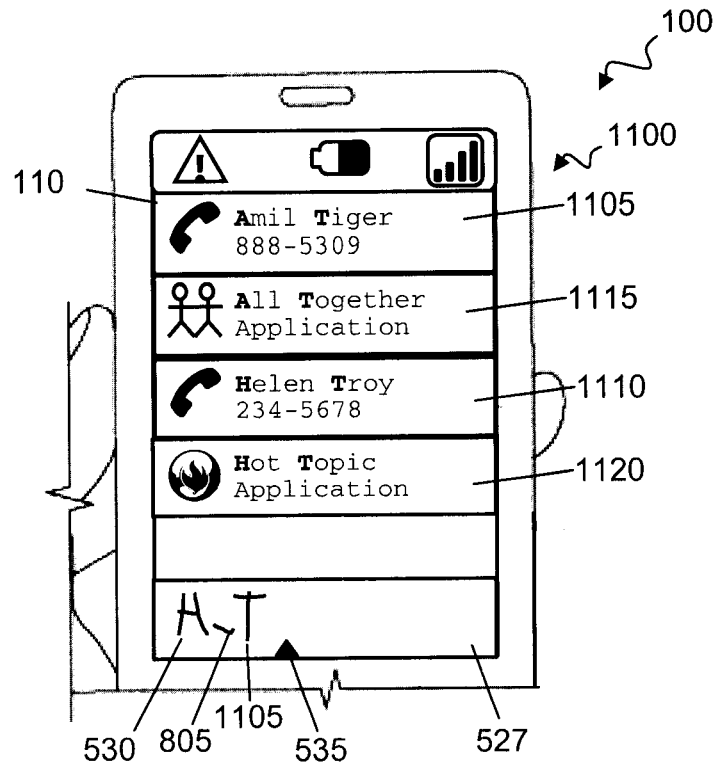
FIG. 11 is a schematic representation of a presentation of identifiers of candidate objects that have been identified in a search conducted using interpretations of character interactions as two separate prefixes.

FIG. 11 is a schematic representation of a presentation 1100 of identifiers of at least a portion of the candidate objects that have been identified in a search conducted as specified by user interaction 805, i.e., using interpretations of character interactions as two separate prefixes. The candidate object identifiers presented in presentation 1100 include a pair of phone contact object identifiers 1105, 1110 and a pair of application object identifiers 1115, 1120.

Each of object identifiers 1105, 1110, 1115, 1120 is marked to indicate why it is identifiable by an interpretation of the combination of character interactions in a search conducted as specified by user interaction 805. In particular, the first letter of the first terms in the contact identifiers in phone contact object identifiers 1105, 1110 are displayed in boldface type to indicate that they match interpretations character interactions that precede user interaction 805. The first letter of the second terms in the contact identifiers in phone contact object identifiers 1105, 1110 are displayed in boldface type to indicate that they match interpretations character interactions that follow user interaction 805. As shown, the letters in the first and second terms of the contact identifiers need not be matched to the same interpretations. In particular, the terms in phone contact object identifier 1105 are matched to an interpretation of a preceding character interaction as the letter "A" and a subsequent character interaction as the letter "T." The terms in phone contact object identifier 1110 are matched to an interpretation of a preceding character interaction as the letter "H" and a subsequent character interaction as the letter "T." Further, the first letter of the first terms in the textual identifiers in application object identifiers 1115, 1120 are displayed in boldface type to indicate that they match interpretations character interactions that precede user interaction 805 and the first letter of the second terms in the textual identifiers in application object identifiers 1115, 1120 are displayed in boldface type to indicate that they match interpretations character interactions that follow user interaction 805.

As shown, character interaction display area 527 has been updated to include a likeness 1105 of subsequent character interaction 1005. Further, cursor indicium 535 has been advanced to the right across character interaction display area 527 to indicate receipt of subsequent character interaction 1005. In some instances, the object of the search is identified among object identifiers 1105, 1110, 1115, 1120 and a user who recognizes it can interact with device 100 to access the object of the search.

If the object of the search is not identified among candidate object identifiers presented in presentation 1100, touchscreen 110 can interact with a user to receive one or more additional character interactions.

Figure 12:
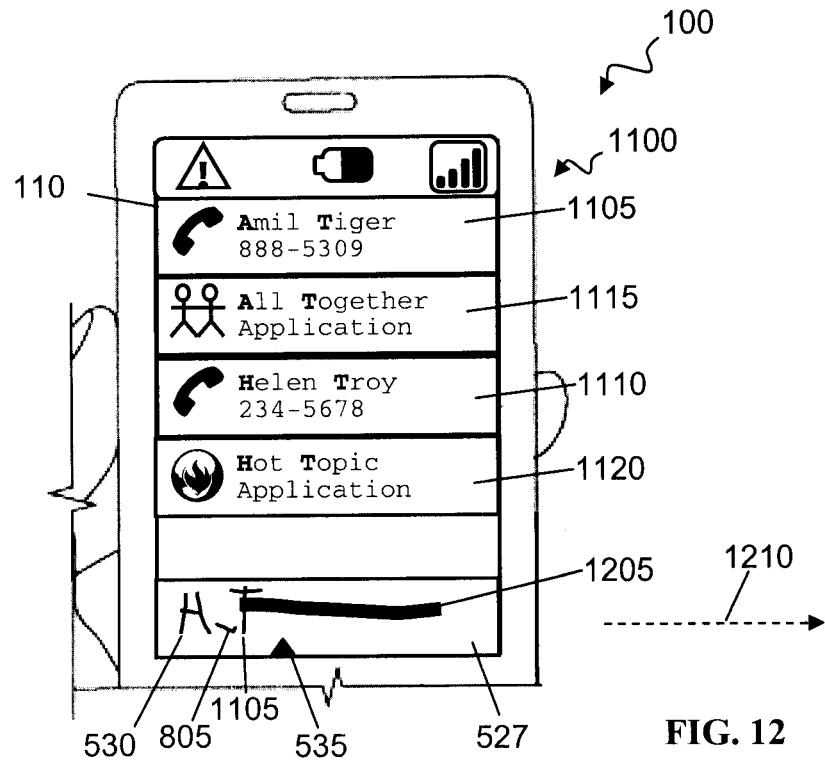
FIG. 12 is a schematic representation of a receipt of user interaction that specifies that an immediately preceding character interaction is not to be interpreted but rather deleted.

In some implementations, interaction with touchscreen 110 of device 100 can be interpreted as an indication that a character interaction is not to be interpreted and used. For example, FIG. 12 is a schematic representation of a receipt of user interaction 1205 that specifies that an immediately preceding character interaction is not to be interpreted but rather deleted from the combinations used to search (or, as the case may be, used for other purposes). User interaction 1205 can be received, e.g., with candidate objects from prior searches presented on touchscreen 110. User interaction 1205 is not required to overlap likeness 1105 of the immediately preceding character interaction.

In some implementations, the device interpreting user interaction can require that user interaction 1205 occur within a specific locale on touchscreen 110. The locale can differ from the areas which are available for receiving character interactions. For example, in the illustrated implementation, the device interpreting user interaction can require that user interaction 1205 occur within character interaction display area 527 and that character interactions be received over the same portion of touchscreen 110 that presents candidate objects.

In some implementations, the device interpreting user interaction can require that user interaction 1210 be formed by movement across touchscreen 110 in a certain direction.

For example, the device interpreting user interaction with touchscreen 110 may only interpret horizontal paths of a member moving horizontally from left to right, i.e., in the direction of arrow 1210, as user interaction 1205. Such a directionality requirement, especially when combined with a requirement that user interaction 1205 occur within a specific locale, can be useful in distinguishing user interaction 1205 from other horizontal user interactions such as user interaction 805.

For the sake of consistency, user interaction 1205 is shown received in the context of the display of presentation 1100 by device 100. However, user interaction 1205 can also be received in other contexts, including those where user interaction 805 has not preceded user interaction 1205 and/or in contexts where only a single character interaction precedes user interaction 1205. For example, user interaction 1205 can be received in the context of the display of presentation 500 by device 100.

Figure 13:
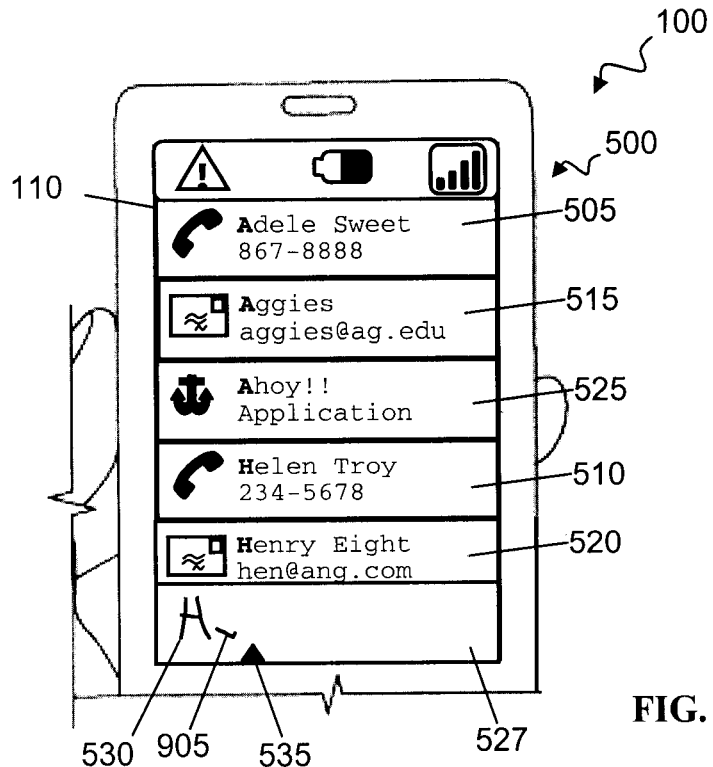
FIG. 13 is a schematic representation of the touchscreen of the device of FIG. 1 after user interaction has been interpreted to be user interaction that specifies that an immediately preceding character interaction is not to be interpreted but rather deleted.

FIG. 13 is a schematic representation of touchscreen 110 after user interaction with touchscreen 110 has been interpreted to be user interaction 1205. Touchscreen 110 displays presentation 500 of candidate object identifiers that are yielded by a search using multiple interpretations of the remaining character interactions. In the illustrated implementation, the likenesses of these remaining character interactions are displayed in character interaction display area 527. However, likeness 1105 has been deleted from character interaction display area 527 and cursor indicium 535 has been shifted to the left to indicate that the character interaction which immediately preceded user interaction 1205 is no longer being used in the search which located candidate object identifiers 505, 510, 515, 520, 525.

Figure 14:
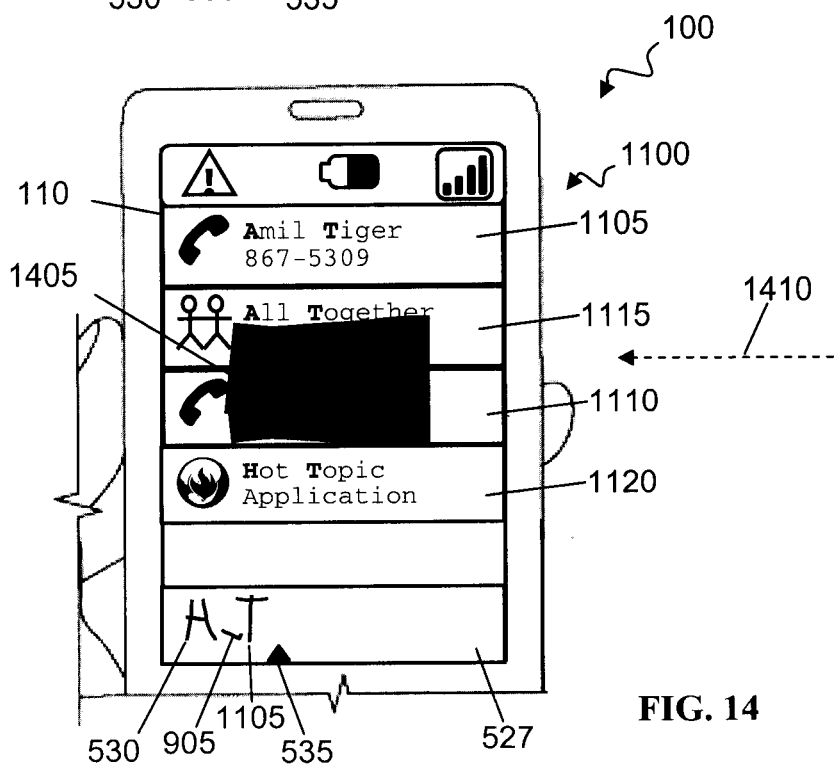
FIG. 14 is a schematic representation of a receipt of user interaction that specifies that a group of character interactions is not to be interpreted and used.

FIG. 14 is a schematic representation of a receipt of user interaction 1405 that specifies that a group of character interactions is not to be interpreted and used. In particular, user interaction 1405 specifies that all of the character interactions in a current session or group are not to be interpreted and used. A session or a group can be delineated in a number of ways, such as by time, location in a collection of activities, or in response to interaction received from a user. In the illustrated implementations, character interaction display area 527 is restricted to displaying likenesses of the character interactions in the current session or group. Thus, user interaction 1405 specifies that the character interactions whose likenesses are displayed in character interaction display area 527 are not to be interpreted and used. User interaction 1405 can be received, e.g., with candidate objects from prior searches presented on touchscreen 110.

In some implementations, the device interpreting user interaction can require that user interaction 1405 be formed by moving a relatively wide member across touchscreen 110 in a certain direction. For example, the device interpreting user interaction with touchscreen 110 may only interpret horizontal paths of a relatively wide member wiping horizontally from left to right, i.e., in the direction of arrow 1410, as user interaction 1405. The relatively wide member may, e.g., have a width that approximates or is larger than the length of the entire fingertip (as opposed to the tip of the fingertip) of a user.

For the sake of consistency, user interaction 1405 is shown received in the context of the display of presentation 1100 by device 100. However, user interaction 1405 can also be received in other contexts, including those where user interaction 805 has not preceded user interaction 1205 and/or in contexts where only a single character interaction precedes user interaction 1405. For example, user interaction 1405 can be received in the context of the display of presentation 500 by device 100. After user interaction with touchscreen 110 has been interpreted to be user interaction 1205, touchscreen 110 generally no longer displays identifiers of candidate objects.

FIG. 15 is a flow chart of a process 1500 for using text translations of user interaction with a touchscreen. In general, process 1500 is performed by a device that includes a touchscreen, such as device 100 (FIG. 1). However, in other implementations, process 1500 is performed by a digital data processing system that receives information characterizing user interaction with a device that includes a touchscreen. For example, in some implementations, process 1500 can be performed by a server system that hosts a search engine or other service provider. Process 1500 can be performed in isolation or in conjunction with other digital data processing operations. For example, in some implementations, process 1500 can be performed at either or both of blocks 315, 340 in process 300 (FIG. 3)

The device performing process 1500 receives a search history, an access history, or both a search and an access history at block 1505. A search history is a record of the textual search queries that have been entered by a particular user or by a group of users. For example, in some implementations, the search history is a record of textual search queries that have been entered into a single device that includes a touchscreen, such as device 100 (FIG. 1). An access history is a record of the data which has been accessed by a particular user or by a group of users. For example, in some implementations, the access history is a record of the contacts which have been opened, the resources which have been accessed on the Internet, and the applications which have been used on a single device that includes a touchscreen, such as device 100 (FIG. 1). The search history can be received from a memory device included in the device performing process 1500 or the search history can be received from a device that includes a touchscreen by, e.g., a server system that performs process 1500.

The device performing process 1500 searches with multiple interpretations of one or more character interactions at block 1510. In some implementations, the device can search one or more indices of identifiers of local data using the multiple interpretations, as described further below. The search yields a collection of candidate object identifiers that are responsive to the character interactions and that identify candidate objects of the search.

The device performing process 1500 scores the candidate objects using the search history, the access history, or both at block 1515. For example, in some implementations, candidate objects which were responsive to prior searches are scored higher than candidate objects which are not responsive to prior searches. As another example, in some implementations, candidate objects which have been accessed more often are scored higher than candidate objects which have not been accessed or which have been accessed less frequently. As another example, in some implementations, the time that has passed since a candidate object was last accessed is considered. For example, a candidate object that was last accessed more recently can be scored higher than a candidate object that was last accessed a longer time ago. In some implementations, two or more of responsiveness to prior searches, frequency of access, and time since last access are considered in scoring and ranking the candidate objects.

In some implementations, a device searches with multiple interpretations of one or more character interactions and scores the candidate objects using the search history simultaneously. For example, the device performing process 1500 can create a high order hidden Markov model that models the transitions of letters and spaces. Each path of the hidden Markov model can be labeled by a previously searched object. When a sequence of character interactions is used to search, the device performing process 1500 finds the scores of all of the paths by matching these paths against the sequence of character interactions. Since multiple paths may lead to the same object (e.g., a previously searched sequence of character interactions), the aggregated score of multiple paths can be used to increase the score of the object for the present sequence of character interactions.

The device performing process 1500 selects and outputs identifiers of one or more scored candidate objects based on the scores at block 1520. For example, a collection of candidate objects can be scored, ranked, and filtered and only identifiers of a proper subset of the collection of candidate objects output. The candidate object identifiers can be output, e.g., on a touchscreen display of the device performing process 1500 or transmitted, from the device performing process 1500, to another device.

Figure 16:
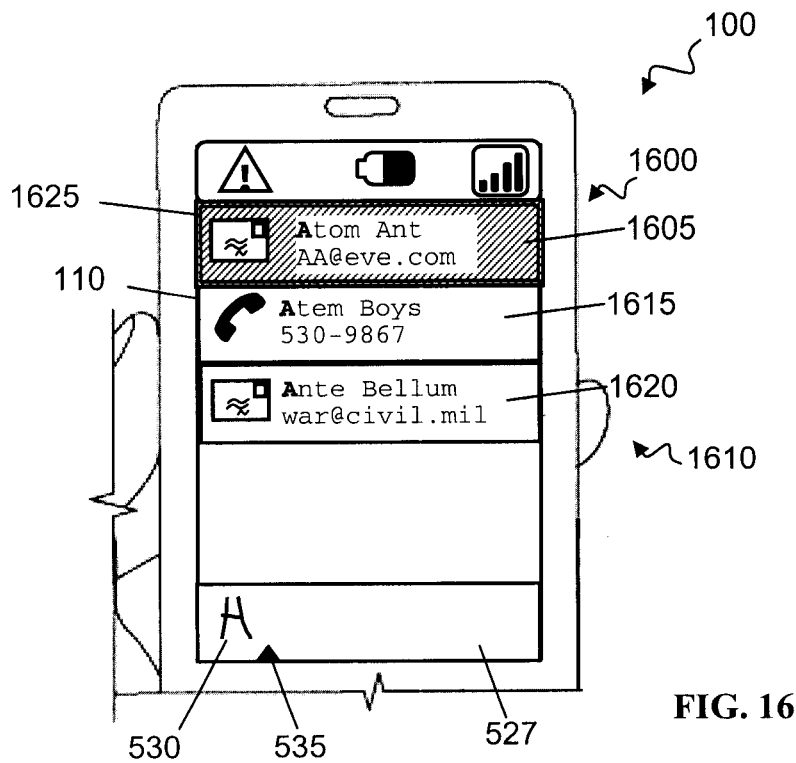
FIG. 16 is a schematic representation of a presentation of identifiers of one or more scored candidate objects on the touchscreen of the device of FIG. 1.

FIG. 16 is a schematic representation of a presentation 1600 of identifiers of one or more scored candidate objects 1605 on touchscreen display 105 of device 100. Scored candidate object identifiers 1605 can be identifiers of phone contact objects, electronic mail contact objects (as shown), application objects, media objects, or other candidate objects of the search. In the illustrated instance, scored candidate object identifier 1605 includes a name or other identifier of the electronic mail contact, the electronic mail address of the electronic mail contact, and an indicium that indicates that the identified candidate object is an electronic mail contact. In other instances, other scored candidate object identifiers 1605 can include other features.

In the illustrated implementation, a single scored candidate object identifier 1605 is presented on touchscreen display 105 in conjunction with presentation 1610 of unscored candidate object identifiers 1610, 1615. Unscored candidate object identifiers 1615, 1620 identify candidate objects identified by a search with multiple interpretations of character interactions that have not been scored using search history or access history. Scored candidate object identifier 1605 is presented in a region 1625 that is demarcated from presentation 100 by color, by shading, or by other demarcation that visually indicates that region 1625 presents scored candidate object identifiers. In other implementations, multiple scored candidate object identifiers can be presented in presentation 1600 alone or in conjunction with presentation 1610.

By presenting one or more scored candidate object identifiers 1605 in conjunction with unscored candidate object identifiers on touchscreen 110, a balance is struck between the benefit of refining the search query using search history or access history and overly constraining the search to exclude desired objects that are rarely searched for or accessed, or are being searched for or accessed for the first time.

Figure 17:
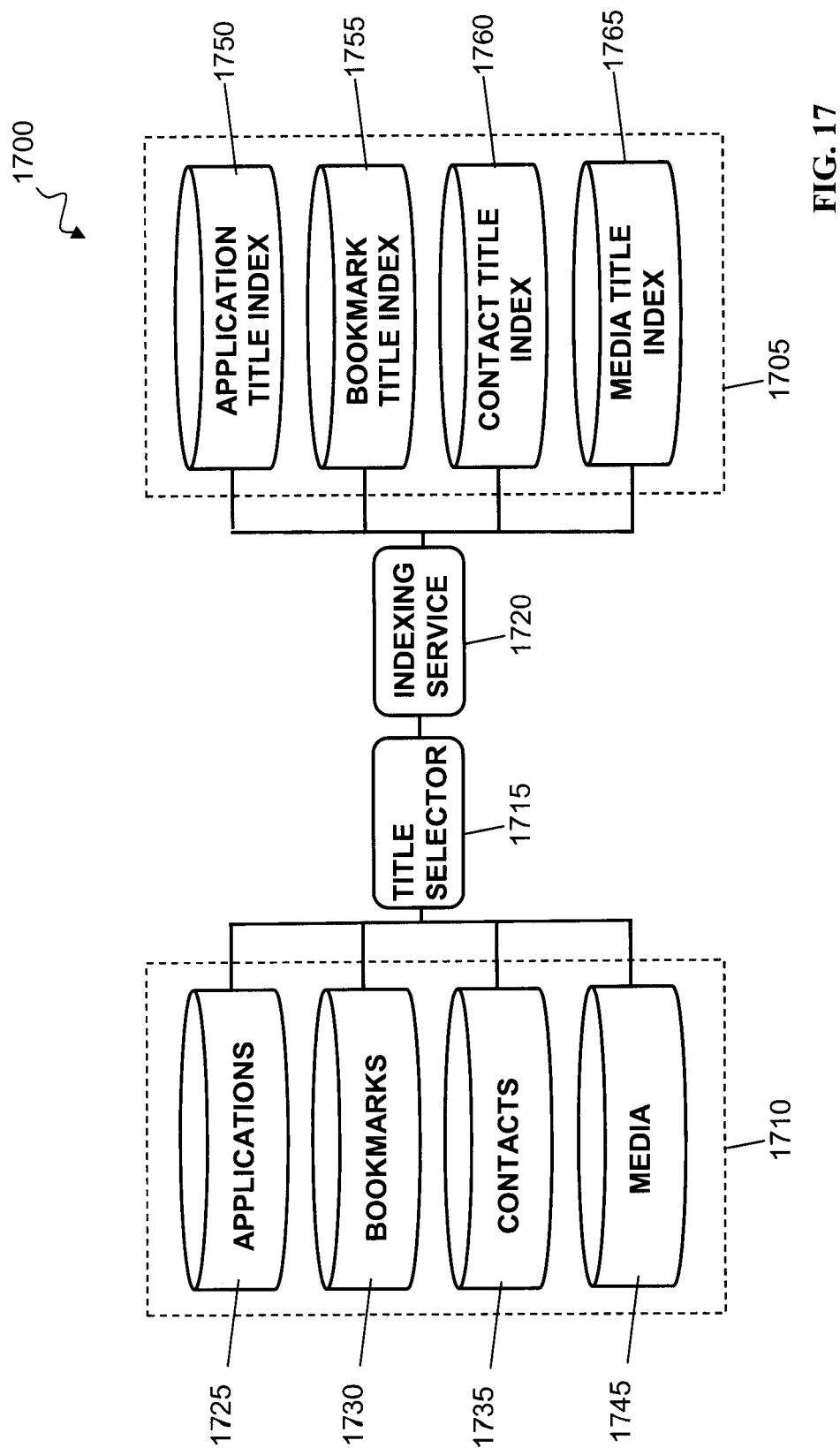
FIG. 17 is a schematic representation of a system for preparing an indexed collection of data that is to be searched using multiple interpretations of one or more character interactions.

FIG. 17 is a schematic representation of a system 1700 for preparing an indexed collection of data 1705 that is to be searched using multiple interpretations of one or more character interactions. System 1700 can be part of a device 100 and indexed data collection 1705 stored in local data store 130 (FIG. 1). In some instances, indexed data collection 1705 is searched using multiple interpretations of one or more character interactions that are received over touchscreen 110 of that same device 100 (FIG. 1).

System 1700 includes a collection of data 1710, a title selector 1715, and an indexing service 1720. Data collection 1710 can be stored one or more data storage devices. Data collection 1710 can include one or more of application data 1725, bookmark data 1730, contact data 1735, media data 1745. Application data 1725 includes sets of machine-readable instructions for performing operations and data characterizing those instructions, including titles of the sets of instructions. For example, application data 1725 can include application instructions 135 in device 100 (FIG. 1). Bookmark data 1730 includes identifiers (such as URI's) of resources that are available on the Internet and titles of those resources. Contact data 1735 includes contact information for other parties. Contact data 1735 can include the names or other identifiers of the other parties, as well as electronic mail addresses, postal addresses, telephone numbers, and other information as the case may be. Media data 1745 includes media files as well as other data characterizing those media files, such as names or other identifiers of the media stored in the files. In some implementations, data 1730, 1735, 1745 is local data 130 that is stored at device 100 (FIG. 1).

Title selector 1715 is a hardware or software component that accesses data 1710 and selects titles therefrom. Title selector 1715 is typically implemented by a digital data processing device that performs data processing activities in accordance with a set of computer program instructions, such as digital data processor 125 (FIG. 1). Title selector 1715 can be programmed to select titles of sets of instructions from application data 1725, titles of resources available on the Internet from bookmark data 1730, names or other identifiers of contacts in contact data 1735, and names or other identifiers of media files from media data 1745.

Indexing service 1715 is a hardware or software component that receives the titles selected by title selector 1715 and forms indexed data collection 1705. Indexed data collection 1705 can be stored one or more data storage devices. Indexed data collection 1705 can include one or more of an application title index 1750, a bookmark title index 1755, contact title index 1760, and media title index 1765. Indices 1750, 1755, 1760, 1765 can be separate from one another or integrated together in various combinations with each other or with other title indexes, as appropriate.

Application title index 1750 is a machine-readable index of the titles of sets of instructions selected from application data 1725. Bookmark title index 1755 is a machine-readable index of the titles of resources available on the Internet selected from bookmark data 1730. Contact title index 1760 is a machine-readable index of names or other identifiers of contacts selected from contact data 1735. Media title index 1765 is a machine-readable index of names or other identifiers of media files selected from media data 1745.

Indexed data collection 1705 can be searched using multiple interpretations of one or more character interactions. For example, entries in indexed data collection 1705 that begin with one of the interpretations of a first character interaction can be identified after the first character interaction is received but before a second character interaction is received. The titles in the entries identify candidate objects for satisfying the search, namely, the corresponding applications, bookmarks, contacts, and media files in data collection 1710. The entries in indexed data collection 1705 can be used to form identifiers of the candidate objects identified by the search, such as the identifiers in presentations 500, 700, 1100, 1600, 1610 (FIGS. 5, 7, 11, 16).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims.

For example, although the specification describes the translation of user interaction with a touchscreen into text that can be used in textual search queries, textual translations of user interaction can be used in other contexts. For example, textual translations of user interaction can be used in authoring e-mails and other documents, in navigating text and other bodies of information, and the like.

In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by system of one or more data processing devices, the method comprising:
    receiving, at the system, information characterizing a first user interaction with a touchscreen;
    receiving, at the system, information characterizing a second user interaction with the touchscreen;
    the system assigning a probability to each of two or more interpretations of a combination of the first user interaction and the second user interaction, each of the interpretations construing the combination as a different pair of characters, each of the probabilities embodying a likelihood that the first user interaction and the second user interaction represent the respective pair of characters, wherein the system assigning the probability to each of the two or more interpretations of the combination of the first user interaction and the second user interaction includes:
        assigning first probabilities to interpretations of the first user interaction,
        independently assigning second probabilities to interpretations of the second user interaction, and
        determining the probabilities assigned to the interpretations of the combination using the first probabilities and the second probabilities;
    the system using the two or more interpretations to search a collection of data for objects that are each identifiable by one of the two or more interpretations; and
    the system outputting identifiers of at least some of the objects.

2. The method of claim 1, wherein outputting the identifiers of the objects comprising selecting, for output, a proper subset of the objects that are identifiable by one of the two or more interpretations, wherein the objects in the proper subset are selected based on the probability assigned to the interpretations by which the objects are identifiable.

3. The method of claim 1, wherein outputting the identifiers of the objects comprises:
    selecting a proper subset of the objects that are identifiable by a first of the two or more interpretations; and
    selecting a proper subset of the objects that are identifiable by a second of the two or more interpretations, wherein a total number of objects selected for output is smaller than the number of objects identifiable by the first of the two or more interpretations, and the first of the two or more interpretations is more likely to be correct than the second of the two or more interpretations.

4. The method of claim 1, wherein:
    the system is a handheld device that comprises the touchscreen and one or more data storage devices;
    the collection of data comprises data stored in the one or more data storage devices; and
    outputting the identifiers of the objects comprises displaying the identifiers on the touchscreen.

5. The method of claim 4, wherein the second user interaction comprises user interaction overlaid on a display of identifiers of objects that are each identifiable by one of the two or more interpretations of the first user interaction with the touchscreen.

6. The method of claim 4, wherein searching the collection of data comprises searching an index of identifiers of objects that are stored locally on the handheld device.

7. The method of claim 1, further comprising:
    receiving, at the system, information characterizing a third user interaction with the touchscreen;
    the system assigning a probability to each of two or more interpretations of a combination of the first user interaction, the second user interaction, and the third user interaction, each of the interpretations construing the combination as a different group of characters, each of the probabilities embodying a likelihood that the first user interaction, the second user interaction, and the third user interaction represent the respective group of characters;
    the system using the two or more interpretations to search the collection of data for objects that are each identifiable by one of the two or more interpretations of the combination of the first user interaction, the second user interaction, and the third user interaction; and
    the system outputting identifiers of the objects that are each identifiable by one of the two or more interpretations of the combination of the first user interaction, the second user interaction, and the third user interaction.

8. The method of claim 1, further comprising receiving, at the system, a command specifying that the first user interaction is to be used to search for a first set of terms that begin with interpretations of the first user interaction and the second user interaction is to be used to search for a second set of terms that begin with interpretations of the second user interaction, wherein the terms in the second set are associated with the terms in the first set.

9. The method of claim 1, wherein determining the probabilities assigned to the interpretations of the combination of the first user interaction and the second user interaction comprises:
    multiplying each of the first probabilities by each of the second probabilities to determine the probabilities assigned to the interpretations of the combination.

10. The method of claim 1, further comprising:
    receiving, at the system, information characterizing an access history at a device that includes the touchscreen;
    the system scoring the objects using the access history, the score of each object embodying how often the object has been accessed by the device that includes the touchscreen;
    the system selecting a proper subset of the objects identifiable by one of the two or more interpretations based on the scores of the objects; and
    the system outputting identifiers of the objects in the proper subset.

11. The method of claim 1, wherein outputting the identifiers of the objects comprises marking the identifiers of the objects on a display screen to indicate why the objects are identifiable by the combination of the first user interaction and the second user interaction.

12. A device comprising:
a touchscreen;
a data store comprising one or more data storage devices storing a collection of local data, the local data including personal contacts or media files; and
a data processor programmed to perform data processing activities, the activities including:
a drawn user input translator to translate a first user interaction with the touchscreen into two or more characters, wherein the drawn user input translator is further configured to:
assign first probabilities to each of the two or more characters into which the first user interaction with the touchscreen is translated, each of the probabilities embodying a likelihood that the first user interaction represents the respective character;
independently assign second probabilities to each of two or more characters into which a second user interaction with the touchscreen is translated, each of the probabilities embodying a likelihood that the second user interaction represents the respective character; and
determine the probabilities assigned to the interpretations of the combination using the first probabilities and the second probabilities;
a search engine to identify the personal contacts or the media files that are identifiable by the two or more characters into which the first user interaction is translated by the drawn user input translator, and
a display manager to present identifiers of at least some of the personal contacts or the media files that are identified by the search engine on the touchscreen, wherein a first of the identifiers presented on the touchscreen identifies a first contact or a first media file that is identifiable by a first of the characters into which the first user interaction is translated, and a second of the identifiers presented on the touchscreen identifies a second contact or a second media file that is identifiable by a second of the characters into which the first user interaction is translated.

13. The device of claim 12, wherein:
a third contact or a third media file is identifiable by one of the characters into which the first user interaction is translated; and
the data processor is further programmed to:
score the first contact or the first media file using a historical record of access of the first contact or the first media file;
score the third contact or the third media file using a historical record of access of the third contact or the third media file; and
select the first of the identifiers for presentation on the touchscreen in response to the first contact or the first media file having been accessed more often than the third contact or the third media file.

14. The device of claim 12, wherein:
the first of the identifiers comprises a first marking indicating why the first contact or the first media file is identifiable by the first of the characters; and
the second of the identifiers comprises a second marking indicating why the second contact or the second media file is identifiable by the second of the characters.

15. The device of claim 12, wherein the data processor is further programmed to
determine the probabilities assigned to the interpretations of the combination by multiplying each of the first probabilities by each of the second probabilities.

16. The device of claim 12, wherein the data processor is further programmed to:
select a proper subset of the contacts or media files that are identifiable by the first of the characters for a presentation on the touchscreen; and
select a proper subset of the objects that are identifiable by the second of the characters for the presentation on the touchscreen, wherein a total number of objects selected for output is smaller than the number of objects identifiable by the first of the characters, and the first of the characters is more likely to be correct than the second of the second of the characters.

17. A handheld device comprising:
a system of one or more data processing devices;
a data store of one or more data storage devices; and
a touchscreen, the touchscreen displaying a visual presentation of a collection of identifiers of candidate objects that are identifiable by multiple interpretations of user interaction representing one or more characters;
wherein the system of one or more data processing devices is configured to:
assign first probabilities to each of two or more characters into which a first user interaction with the touchscreen is translated, each of the probabilities embodying a likelihood that the first user interaction represents the respective character;
independently assign second probabilities to each of two or more characters into which a second user interaction with the touchscreen is translated, each of the probabilities embodying a likelihood that the second user interaction represents the respective character; and
determine the probabilities assigned to the interpretations of the combination using the first probabilities and the second probabilities;
wherein at least two of the candidate objects are identifiable by different interpretations of the user interaction representing the one or more characters; and
wherein at least a portion of the visual presentation of the identifier collection is operative to receive a subsequent user interaction representing a further character.

18. The handheld device of claim 17, wherein the touchscreen further comprises a user interaction display area displaying smaller-sized likenesses of the user interaction.

19. The handheld device of claim 17, wherein the visual presentation comprises an identifier of a first candidate object that has been selected from amongst a collection of candidate objects that are identifiable by the multiple interpretations of the user interaction based on a historical record of access of the first candidate object.

20. The handheld device of claim 19, wherein the visual presentation further comprises an identifier of a second candidate object that has been selected from amongst a collection of candidate objects that are identifiable by the multiple interpretations of the user interaction without using a historical record of access of the second candidate object.

21. The handheld device of claim 17, wherein the data store comprises an index of the identifiers of the candidate objects, the candidate objects being stored in the data store.

22. The handheld device of claim 21, wherein the candidate objects comprise contacts and applications.

* * * * *